(12) United States Patent
Koskinen et al.

(10) Patent No.: US 10,779,205 B2
(45) Date of Patent: Sep. 15, 2020

(54) METHOD AND APPARATUS FOR OVERLAPPING FREQUENCY BAND ENHANCEMENT

(71) Applicant: Nokia Corporation, Espoo (FI)

(72) Inventors: Jussi-Pekka Koskinen, Oulu (FI); Jarkko Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/345,403

(22) PCT Filed: Sep. 21, 2012

(86) PCT No.: PCT/IB2012/055043
§ 371 (c)(1),
(2) Date: Mar. 17, 2014

(87) PCT Pub. No.: WO2013/042090
PCT Pub. Date: Mar. 28, 2013

(65) Prior Publication Data
US 2015/0017986 A1    Jan. 15, 2015

Related U.S. Application Data

(60) Provisional application No. 61/538,496, filed on Sep. 23, 2011.

(51) Int. Cl.
*H04W 36/00* (2009.01)
(52) U.S. Cl.
CPC ... *H04W 36/0083* (2013.01); *H04W 36/0061* (2013.01); *H04W 36/00835* (2018.08)
(58) Field of Classification Search
CPC .................................................. H04W 36/30
See application file for complete search history.

(56) References Cited

U.S. PATENT DOCUMENTS 5,666,650 A    9/1997  Turcotte et al.
5,839,070 A    11/1998 Lupien et al.
(Continued)

FOREIGN PATENT DOCUMENTS

EP    1427239 A2    6/2004
EP    2129176 A2    12/2009
(Continued)

OTHER PUBLICATIONS

"Digital Cellular Telecommunications system; Multiband Operation of GSM/DCS 1 800 by a Single Operator", ETSI Technical Report, Global System for Mobile Communications, GSM 03.26, V 5.0.0, Nov. 1996, pp. 1-14.
(Continued)

*Primary Examiner* — Charles N Appiah
*Assistant Examiner* — Frank E Donado
(74) *Attorney, Agent, or Firm* — Mintz Levin Cohn Ferris Glovsky and Popeo, P.C.

(57) ABSTRACT

In accordance with an example embodiment of the present invention, an apparatus comprising: at least one processor; and at least one memory including computer program code, wherein the at least one memory and the computer program code are configured to, with the at least one processor cause the apparatus to perform at least the following: receive a neighbor cell list for a primary frequency band; and evaluate one or more available secondary frequency bands based on the neighbor cell list for the primary frequency band for reselection.

15 Claims, 5 Drawing Sheets

(56) References Cited

U.S. PATENT DOCUMENTS

| | | | |
|---|---|---|---|
| 6,285,684 B1* | 9/2001 | Suzuki et al. | 370/471 |
| 6,421,328 B1 | 7/2002 | Larribeau et al. | |
| 6,546,250 B1 | 4/2003 | Turcotte et al. | |
| 6,748,221 B1* | 6/2004 | Peltola | H04W 48/18 455/450 |
| 8,547,939 B1* | 10/2013 | Vargantwar | 370/333 |
| 8,838,108 B2* | 9/2014 | Swaminathan | H04W 36/0061 455/436 |
| 2008/0233955 A1* | 9/2008 | Narang | H04W 48/16 455/434 |
| 2008/0310358 A1* | 12/2008 | Shaheen | H04W 48/14 370/329 |
| 2009/0275325 A1 | 11/2009 | Davis | |
| 2010/0105392 A1 | 4/2010 | Cheng et al. | |
| 2010/0136969 A1 | 6/2010 | Nader et al. | |
| 2010/0197301 A1* | 8/2010 | Islam | H04W 24/00 455/434 |
| 2010/0279677 A1* | 11/2010 | Dwyer | H04W 48/16 455/422.1 |
| 2011/0053601 A1* | 3/2011 | Frederiksen | H04J 11/0093 455/447 |
| 2011/0098046 A1 | 4/2011 | Shin | |
| 2011/0183694 A1 | 7/2011 | Han | |
| 2011/0299488 A1* | 12/2011 | Kim | H04W 16/16 370/329 |
| 2011/0319076 A1* | 12/2011 | Ramasamy | H04W 48/16 455/434 |
| 2012/0015653 A1* | 1/2012 | Paliwal | H04W 24/10 455/435.1 |
| 2012/0113825 A1* | 5/2012 | Baglin | H04W 24/00 370/252 |
| 2013/0078989 A1 | 3/2013 | Kubota et al. | |
| 2013/0242767 A1* | 9/2013 | Sfar | 370/252 |

FOREIGN PATENT DOCUMENTS

| | | |
|---|---|---|
| EP | 2214441 | 8/2010 |
| EP | 2249607 | 11/2010 |
| EP | 2249609 | 11/2010 |
| WO | 2009/112413 A1 | 9/2009 |
| WO | 2010/063596 A1 | 6/2010 |

OTHER PUBLICATIONS

"3rd Generation Partnership Project;Technical Specification Group Radio Access Network Extending 850MHz Study Item Technical Report(Release 9)", 3GPP TR 37.806, v1.0.0, Jun. 2011, pp. 1-73.

"3rd Generation Partnership Project; Technical Specification Group Radio Access Network; RadioResource Control (RRC); Protocol specification(Release 10)", 3GPP TS 25.331, V10.4.0, Jun. 2011, pp. 1-1879.

International Search Report received for corresponding Patent Cooperation Treaty Application No. PCT/IB2012/055043 dated May 6, 2013, 5 pages.

Extended European Search Report received for corresponding European Patent Application No. 12833990.0, dated May 29, 2015, 9 pages.

* cited by examiner

METHOD AND APPARATUS FOR OVERLAPPING FREQUENCY BAND ENHANCEMENT

RELATED APPLICATION

This application was originally filed as PCT Application No. PCT/IB2012/055043 filed Sep. 21, 2012, which claims priority benefit from U.S. Ser. No. 61/538,496, filed on Sep. 23, 2011.

TECHNOLOGICAL FIELD

Embodiments of the present invention relate generally to wireless communications technology and, more particularly, relate to a method, apparatus, and computer program product for overlapping frequency band operations.

BACKGROUND

With the increased demands for wireless communications, new frequency bands ("bands") are routinely created. In instances in which a new band is created, mobile terminals may be created to make use of the new bands, while a majority of mobile terminals may still operate on legacy bands. Indeed the new mobile terminals may also be configured to operate on the legacy bands.

Generally, for example, overlapping bands, such as for example band 26, may indicate support for the overlapping bands such as Band 5, 18 and/or 19 in its capability. Band 26 is further described in 3rd Generation Partnership Project (3GPP) TR 37.806 v1.0.0 which is incorporated by reference herein.

In instances in which there are overlapping bands and as reflected in Universal Terrestrial Radio Access (UTRA) specifications of 3GPP TS 25.331, which is hereby incorporated by reference, a neighbor cell list is linked to an absolute radio frequency channel number (ARFCN). In overlapping bands (e.g. band 26) linking the ARFCN to a neighbor cell list may cause the inclusion of neighboring frequencies and/or cells (which are part of multiple bands) multiple times in the neighbor cell list with multiple different ARFCNs. Such multiple inclusions in the neighbor cell list may lead, for example, to system information message size increases because the same neighbors are included multiple times. Alternatively or additionally, for example, a mobile terminal that supports multiple bands may perform cell re-selection evaluation and potentially measurement reporting triggering evaluation multiple times for the same cells.

BRIEF SUMMARY

A method, apparatus and computer program product are therefore provided according to an example embodiment to cause a neighbor list to be signaled for the primary ARFCN and/or primary frequency band. For example, the mobile terminal may use the primary band neighbor cell list (NCL) in the re-selection evaluation regardless of whether such a band is supported by the radio frequency of the mobile terminal (e.g. a mobile terminal does not comply with radio frequency performance requirements for a particular frequency band). In a further example embodiment, the mobile terminal may be updated to understand the neighbor cell list of unsupported bands (e.g., ARFCN's of non-supported bands such as those bands in which a radio frequency does not support performance requirements of the band) as well as neighbor cells that are intra-frequency neighbors.

A method, apparatus and computer program product are also provided according to an example embodiment to cause a neighbor cell list to be signaled for all the broadcasted frequency bands and/or ARFCN's. In some example embodiments, where the neighbor cell list is signaled for all of the broadcasted frequency bands and/or ARFCN's, the mobile terminal may be configured to remove duplicate neighbor cells from re-selection and measurement reporting evaluation. Thus the mobile terminal may then consider the ARFCN of one of the plurality of bands for re-selection/cell selection evaluation.

BRIEF DESCRIPTION OF THE DRAWINGS

Figure 1:
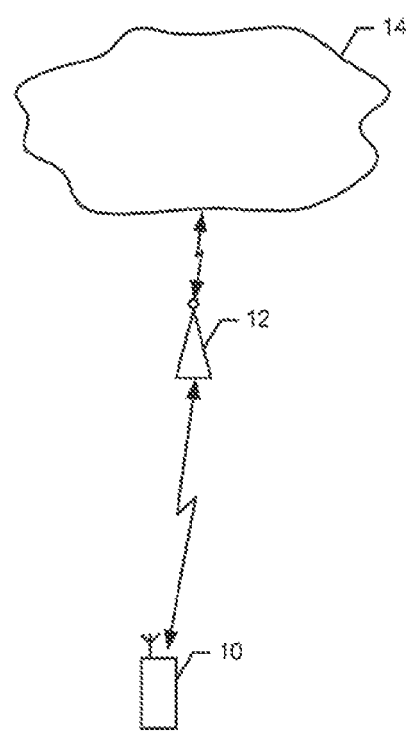
Figure 2:
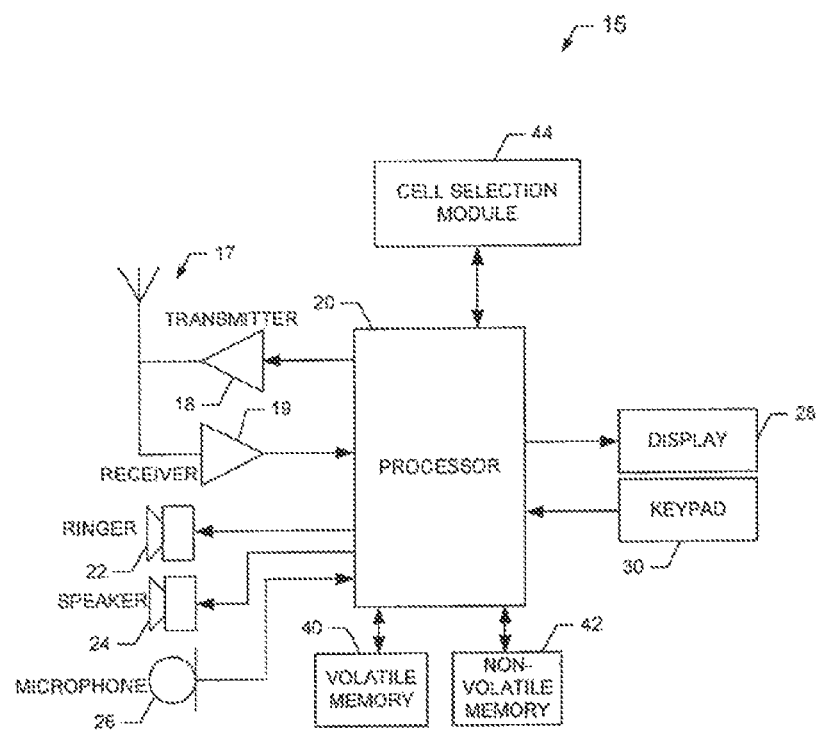
Figure 3:
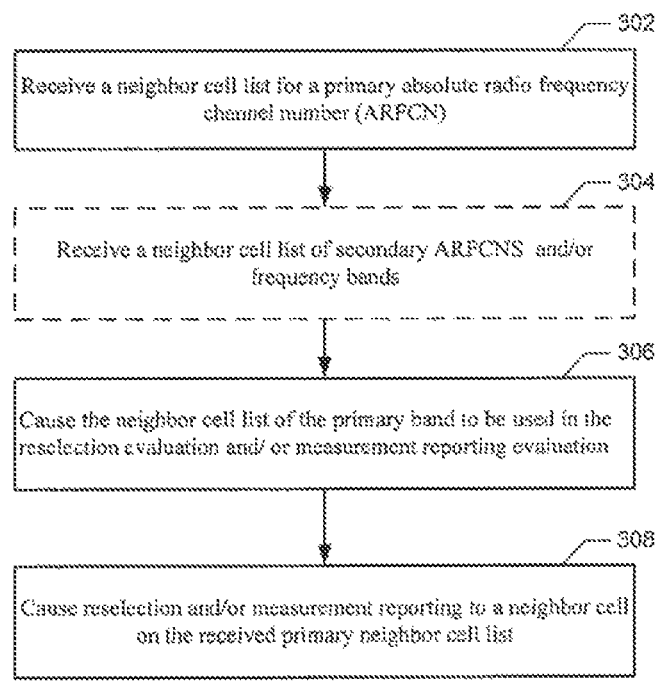
Figure 4:
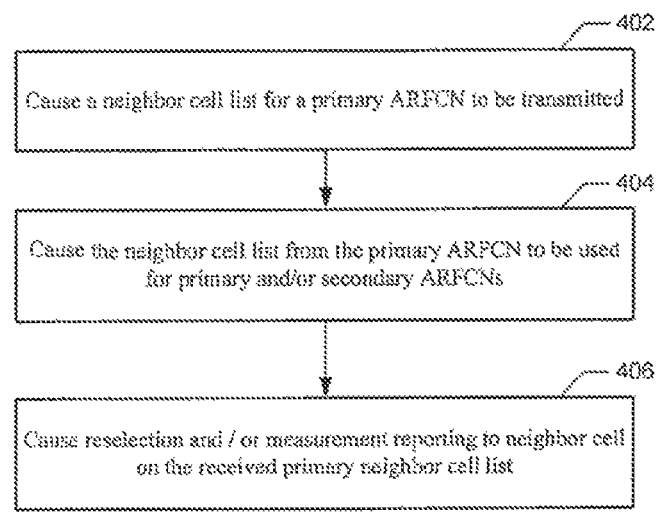
Figure 5:
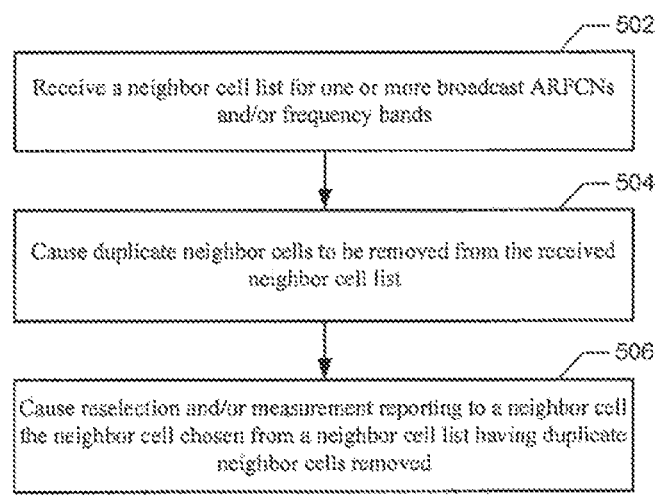

Having thus described embodiments of the invention in general terms, reference will now be made to the accompanying drawings, which are not necessarily drawn to scale, and wherein:

FIG. 1 is a schematic representation of an example system having an example mobile terminal that may be configured to perform one embodiment of the present invention;

FIG. 2 is a block diagram of an example apparatus that may be embodied by an example mobile terminal and/or an example access point in accordance with one embodiment of the present invention;

FIGS. 3 and 4 are flow charts illustrating example of primary band re-selection operations performed in accordance with one embodiment of the present invention; and FIG. 5 is a flow chart illustrating an example of duplicate neighbor cell removal and re-selection operations performed in accordance with an embodiment of the present invention.

DETAILED DESCRIPTION

Some example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

Although the method, apparatus and computer program product may be implemented in a variety of different systems, one example of such a system is shown in FIG. 1, which includes a first communication device (e.g., mobile terminal 10) that is capable of communication via an access point 12, a base station, a CSG cell, a home Node B, a Node B, an evolved Node B (eNB), a neighbor cell or other access point, with a network 14 (e.g., a core network). While the network may be configured in accordance with Long Term Evolution (LTE) or LTE-Advanced (LTE-A), other networks may support the method, apparatus and computer program product of some embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more cells, including access point 12, which may serve a respective coverage area. The access point 12 could be, for example, part of one or more cellular or mobile networks or PLMNs. In turn, other devices such as processing devices (e.g., personal computers, server computers or the like may be coupled to the mobile terminal 10 and/or other communication devices via the network.

A communication device, such as the mobile terminal 10 (also known as user equipment (UE)), may be in communication with other communication devices or other devices via the access point 12 and, in turn, the network 14. In some cases, the communication device may include an antenna for transmitting signals to and for receiving signals from an access point, such as access point 12.

When referred to herein, a serving cell includes, but is not limited to a primary serving cell (PCell) and other serving cells such as secondary serving cells (SCell) that may be operating on an access point, such as access point 12. A candidate cell, target cell, neighbor cell and/or the like may also be used herein, and that includes a cell that is not currently a serving cell, but may become a serving cell in the future. A PCell, which may be embodied by an access point, generally includes, but is not limited to, a cell that is configured to perform initial establishment procedures, security procedures, system information (SI) acquisition and change monitoring procedures on the broadcast channel (BCCH) or data channel (PDCCH), and paging. The SCell, which may be embodied by a remote radio head (RRH) and is configured to provide additional radio resources to the PCell. In an embodiment, a "primary band" is the band that is indicated by the serving cell as the band of a serving carrier frequency. The secondary band is the band that is indicated by the serving cell as an additional band (e.g. in addition to primary band), that allows a mobile terminal radio frequency that is supported by the secondary band to also camp on the cell.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

In one embodiment, for example, the mobile terminal 10 and/or the access point 12 may be embodied as or otherwise include an apparatus 15 as generically represented by the block diagram of FIG. 2. While the apparatus 15 may be employed, for example, by a mobile terminal 10 or an access point 12, it should be noted that the components, devices or elements described below may not be mandatory and thus some may be omitted in certain embodiments. Additionally, some embodiments may include further or different components, devices or elements beyond those shown and described herein.

In this regard, FIG. 2 illustrates an example block diagram of an apparatus 15. While several embodiments of a mobile terminal or access point (e.g., apparatus 15) are illustrated and will be hereinafter described for purposes of example, other types of mobile terminals, such as mobile telephones, mobile computers, portable digital assistants (PDAs), pagers, laptop computers, desktop computers, tablets, gaming devices, televisions, and other types of electronic systems, may employ some embodiments of the present invention. Further other types of access points such as a base station, a CSG cell, a home Node B, a Node B, an eNB, a neighbor cell or other access point may employ some embodiments of the present invention.

As shown, the apparatus 15 may include an antenna 17 (or multiple antennas 17) in communication with a transmitter 18 and a receiver 19. The apparatus 15 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the apparatus 15 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from some embodiments of this invention, as should dual or higher mode phones (e.g., digital/analog or TDMA/CDMA/analog phones). Additionally, the apparatus 15 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the apparatus 15. For example, the processor 20 may comprise a digital signal processor device, a microprocessor device, an analog-to-digital converter, a digital-to-analog converter, and/or the like. Control and signal processing functions of the apparatus 15 may be allocated between these devices according to their respective capabilities. Further, the processor may comprise functionality to operate one or more software programs, which may be stored in memory. For example, the processor 20 may be capable of operating a connectivity program, such as a web browser. The connectivity program may allow the apparatus 15 to transmit and receive web content, such as location-based content, according to a protocol, such as Wireless Application Protocol (WAP), hypertext transfer protocol (HTTP), and/or the like. The apparatus 15 may be capable of using a Transmission Control Protocol/Internet Protocol (TCP/IP) to transmit and receive web content across the internet or other networks.

The apparatus 15 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In some embodiments including a keypad, the keypad may comprise numeric (0-9) and related keys (#, *), and/or other keys for operating the mobile terminal.

The apparatus 15 may comprise memory, such as a smart cart, subscriber identity module or subscriber identification module (SIM), a removable user identity module (R-UIM), and/or the like, which may store information elements related to a mobile subscriber. In addition to the SIM, the mobile terminal may comprise other removable and/or fixed memory. The apparatus 15 may include other non-transitory memory, such as at least one of a volatile memory 40 and/or at least one of a non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the apparatus 15.

A cell selection module 44 may be embodied as various means, such as circuitry, hardware, a computer program product comprising computer readable program instructions stored on a computer readable medium (e.g., the memory 40) and executed by a processing device (e.g., the processor 20), or some combination thereof and, in one embodiment, is embodied as or otherwise controlled by the processor 20. In an embodiment, wherein the cell selection module 44 is embodied separately from the processor 20, the cell selection module 44 may be in communication with the processor 20. The cell selection module 44 may further be in communication with one or more of the memory 40 and/or 42, the transmitter 18, and the receiver 19, such as via a bus.

In some example embodiments, the apparatus 15 embodied, for example, by a access point 12, may use the processor 20, the cell selection module 44, or the like to cause a neighbor cell list to be signaled for a primary ARFCN and/or a primary frequency band. In such embodiments, for example, other secondary bands may not be signaled so as to prevent the same cell, using different bands, from being included in neighbor cell list signaling. As described herein a primary band may include legacy signaling and a secondary band may include additional bands which indicate a cell that is configured to allow camping by those mobile terminals with a supportable band.

In some embodiments in which the primary ARFCN and/or a primary frequency band is signaled by example access point 12, an apparatus 15, such as for example the mobile terminal 10 may be configured using means such as the processor 20, the cell selection module 44 or the like to use the primary band neighbor cell list during re-selection evaluation. In some example embodiments, the primary band neighbor cell list may be used even though a primary band may include radio frequency support for radio frequency performance requirements that are not supported by the mobile terminal. In instances in which the mobile terminal supports one or more of the secondary bands and not the primary band, the mobile terminal may be updated to understand the neighbor cell list (e.g. ARFCNs of non-supported bands) of unsupported bands as well and understand that they are intra-frequency neighbors.

Alternatively or additionally, the apparatus 15 embodied, for example, by an access point 12, may use the processor 20, the cell selection module 44, or the like to cause a neighbor cell list to be signaled for one or more of the broadcasted ARFCNs and/or frequency bands. In some embodiments in which one or more of the ARFCNs and/or frequency bands are signaled by example access point 12, an apparatus 15, the mobile terminal 10, may be configured using means such as the processor 20, the cell selection module 44 or the like to remove duplicate neighbor cells from re-selection and measurement reporting evaluation. In an example embodiment, the processor 20, the cell selection module 44 or the like may consider the ARFCNs of a band of the plurality of bands indicated by a cell and/or an access point during re-selection evaluation.

FIGS. 3-5 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 40, 42 of an apparatus employing an embodiment of the present invention and executed by a processor 20 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3-5, when executed, convert a computer or processing circuitry into a particular machine configured to perform an example embodiment of the present invention. Accordingly, the operations of FIGS. 3-5 define an algorithm for configuring a computer or processing to perform an example embodiment. In some cases, a general purpose computer may be provided with an instance of the processor which performs the algorithms of FIGS. 3-5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 3 is an example flowchart illustrating an example mobile terminal for performing neighbor cell list enhancement in accordance with an embodiment of the present invention. As shown in operation 302, the apparatus 15 embodied, for example, by a mobile terminal 10, may include means, such as the receiver 19, the processor 20, the cell selection module 44, or the like, for receiving a neighbor cell list for a primary ARFCN. The apparatus 15 embodied, for example, by a mobile terminal 10 may be configured to support multiple frequency bands, but as shown with reference to operation 302 may only receive the neighbor cell list for the primary band. Alternatively or additionally, the apparatus 15 embodied, for example, by a mobile terminal 10 may only be configured to operate on a secondary band, but as shown in operation 302 may still receive the neighbor cell list in the primary band (e.g. even if the mobile terminal radio frequency does not support it).

As shown in optional operation 304, the apparatus 15 embodied, for example, by a mobile terminal 10, may include means, such as the receiver 19, the processor 20, the cell selection module 44, and/or the like for receiving a neighbor cell list of one or more secondary ARFCN's and/or frequency bands. Alternatively or additionally, for example, the mobile terminal 10 may be updated to understand the neighbor cell list of unsupported bands (e.g., ARFCN's of non-supported bands such as those bands in which a radio frequency does not support performance requirements of the band) as well as neighbor cells that are intra-frequency neighbors. Alternatively or additionally operation 304 may be removed and the apparatus 15 embodied, for example, by a mobile terminal 10 may only receive the neighbor cell list for the primary band as shown in operation 302.

As shown in operation 306, the apparatus 15 embodied, for example, by a mobile terminal 10, may include means, such as the processor 20, the cell selection module 44, and/or the like, for causing the neighbor cell list of the primary band to be used in the reselection evaluation and/or measurement reporting evaluation. As shown in operation 308, the apparatus 15 embodied, for example, by a mobile terminal 10, may include means, such as the processor 20, the cell selection module 44, and/or the like, for reselection and/or measurement reporting to a neighbor cell on the received primary neighbor cell list.

FIG. 4 is an example flowchart illustrating example neighbor cell list enhancement with respect to an access point performed in accordance with an embodiment of the present invention. As shown in operation 402, the apparatus 15 embodied, for example, by an access point 12, may include means, such as the transmitter 18, the processor 20, the cell selection module 44, and/or the like for causing a neighbor cell list for a primary ARFCN to be transmitted. As shown in operation 404, the apparatus 15 embodied, for example, by an access point 12, may include means, such as the transmitter 18, the processor 20, the cell selection module 44, and/or the like for causing the neighbor cell list from the primary ARFCN to be used for primary and/or secondary ARFCNs. As shown in operation 406, the apparatus 15 embodied, for example, by an access point 12, may include means, such as the transmitter 18, the processor 20, the cell selection module 44, and/or the like for causing reselection and/or measurement reporting to neighbor cell on the received primary neighbor cell list.

FIG. 5 illustrates a flow diagram that illustrates example neighbor cell list enhancement performed by a mobile terminal, according to an embodiment of the current invention. As shown in operation 502, the apparatus 15 embodied, for example, by a mobile terminal 10, may include means, such as the receiver 19, the processor 20, the cell selection module 44 and/or the like for receiving a neighbor cell list for one or more broadcast ARFCNs and/or frequency bands. As shown in operation 504, the apparatus 15 embodied, for example, by a mobile terminal 10, may include means, such as the processor 20, the cell selection module 44 and/or the like for causing duplicate neighbor cells to be removed from the received neighbor cell list. For example, the mobile terminal 10 may be configured to select the primary band for each of the neighbor cells and may remove/ignore the secondary bands. As shown in operation 506, the apparatus 15 embodied, for example, by a mobile terminal 10, may include means, such as the transmitter 18, the receiver 19, the processor 20, the cell selection module 44 and/or the like for causing reselection and/or measurement reporting to a neighbor cell the neighbor cell chosen from a neighbor cell list having duplicate neighbor cells removed.

Alternatively or additionally, the apparatus 15 embodied, for example, by an access point 12, may include means, such as the transmitter 18, the processor 20, the cell selection module 44, and/or the like for causing a neighbor cell list(s) for one or more broadcast frequency bands and/or ARFCNs to be transmitted. Alternatively or additionally, the apparatus 15 embodied, for example, by an access point 12, may include means, such as, the processor 20, the cell selection module 44, and/or the like for causing the mobile terminal to consider an ARFCN of the one or more transmitted ARFCNs.

In an example embodiment, an apparatus for performing the methods of FIGS. 3-5 and other methods described above may comprise a processor (for example, the processor 20) configured to perform some or each of the operations (302-308, 402-406, and 502-506) described above. The processor may, for example, be configured to perform the operations (302-308, 402-406, and 502-506) by performing hardware implemented logical functions, executing stored instructions, or executing algorithms for performing each of the operations. However, the above-described portions of the apparatus 15, the access point 12 and the mobile terminal 10 as they relate to the operations of the method illustrated in FIGS. 3-5 are merely examples, and it should be understood that various other embodiments may be possible.

In an embodiment, an example method includes receiving a neighbor cell list for a primary frequency band and/or ARFCN. A method also includes receiving a neighbor cell list of secondary band, wherein the secondary bands identify neighbor cells that are intra-frequency neighbors. A method also includes causing a primary band to be used in the re-selection evaluation. A method further includes causing re-selection to neighbor cell on the received primary neighbor cell list.

In another embodiment, an apparatus comprising a processor and a memory including software, the memory and the software configured to, with the processor, cause the apparatus at least to receive a neighbor cell list for a primary ARFCN. The apparatus is further caused to receive a neighbor cell list of secondary band, wherein the secondary bands identify neighbor cells that are intra-frequency neighbors. The apparatus is further caused to cause a primary band to be used in the re-selection evaluation. The apparatus is further caused to cause a re-selection to neighbor cell on the received primary neighbor cell list.

In a further embodiment, a computer program product comprising at least one computer readable non-transitory memory having program code stored thereon, the program code which when executed by an apparatus cause the apparatus at least to receive a neighbor cell list for a primary ARFCN. A computer program product also includes program code that is further configured to receive a neighbor cell list of secondary band, wherein the secondary bands identify neighbor cells that are intra-frequency neighbors. A computer program product also includes program code that is further configured to cause a primary band to be used in the re-selection evaluation. A computer program product also includes program code that is further configured to cause a re-selection to neighbor cell on the received primary neighbor cell list.

In an embodiment, an example apparatus includes means for receiving a neighbor cell list for a primary ARFCN. An apparatus also includes means for receiving a neighbor cell list of secondary band, wherein the secondary bands identify neighbor cells that are intra-frequency neighbors. An apparatus also includes means for causing a primary band to be used in the re-selection evaluation. An apparatus further includes means for causing re-selection to neighbor cell on the received primary neighbor cell list.

In an embodiment, a method includes receiving a neighbor cell list for one or more broadcast ARFCNs and/or bands. A method also includes causing duplicate neighbor cells to be removed from the received neighbor cell list during re-selection and measurement reporting evaluation. A method also includes causing one band of the plurality of bands provided by a neighbor cells to be considered for re-selection.

In another embodiment, an apparatus comprising a processor and a memory including software, the memory and the software configured to, with the processor, cause the apparatus at least to cause the apparatus at least to receive a neighbor cell list for one or more broadcast ARFCNs and/or bands. The apparatus is further caused to cause duplicate neighbor cells to be removed from the received neighbor cell list during re-selection and measurement reporting evaluation. The apparatus is further caused to cause one band of the plurality of bands provided by a neighbor cells to be considered for re-selection.

In a further embodiment, a computer program product comprising at least one computer readable non-transitory memory having program code stored thereon, the program code which when executed by an apparatus cause the apparatus at least to receive a neighbor cell list for one or more broadcast ARFCNs and/or bands. A computer program product also includes program code that is further configured to duplicate neighbor cells to be removed from the received neighbor cell list during re-selection and measurement reporting evaluation. A computer program product also includes program code that is further configured to cause one band of the plurality of bands provided by a neighbor cells to be considered for re-selection.

In yet another embodiment, an apparatus is provided that includes means for receiving a neighbor cell list for one or more broadcast ARFCNs and/or bands. An apparatus further includes means for causing duplicate neighbor cells to be removed from the received neighbor cell list during re-selection and measurement reporting evaluation. An apparatus further includes means for causing one band of the plurality of bands provided by a neighbor cells to be considered for re-selection.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method, comprising:
receiving, at a user equipment, a neighbor cell list for a primary frequency band rather than a secondary frequency band, the primary frequency band having one or more reselection parameters in common with the secondary frequency band, wherein the primary frequency band is a band that is indicated by a serving cell as the band of a serving carrier frequency, and the secondary band is a band that is indicated by the serving cell as an additional band that allows the user equipment to also camp on the cell using a radio frequency that is supported by the secondary band; and
performing, by the user equipment operating on the secondary frequency band, a reselection on the secondary frequency band by at least evaluating one or more available neighbor cells included in the neighbor cell list for the primary frequency band.

2. The method according to claim 1, further comprising:
reselecting, based on the evaluation of the one or more neighbor cells, to a neighbor cell included in the neighbor cell list of the primary frequency band.

3. The method according to claim 2, further comprising:
determining, based on an absolute radio frequency channel number for the primary frequency band, an absolute radio frequency channel number for a frequency band supported by the user equipment.

4. The method according to claim 1, further comprising:
receiving, at the user equipment, a neighbor cell list for the secondary frequency band, wherein the neighbor cell list identifies one or more neighbor cells that are intra-frequency neighbors, and wherein the neighbor cell list for the secondary frequency band is same as the neighbor cell list for the primary frequency band.

5. The method according to claim 1, further comprising:
determining, by the user equipment, that the primary frequency band is not supported; and
reselecting, by the user equipment, to a neighbor cell on a supported frequency band.

6. An apparatus comprising:
at least one processor; and
at least one memory including computer program code, the at least one memory and the computer program code configured to, with the at least one processor, cause the apparatus to at least:
receive a neighbor cell list for a primary frequency band rather than a secondary frequency band, the primary frequency band having one or more reselection parameters in common with the secondary frequency band, wherein the primary frequency band is a band that is indicated by a serving cell as the band of a serving carrier frequency, and the secondary band is a band that is indicated by the serving cell as an additional band that allows a user equipment to also camp on the cell using a radio frequency that is supported by the secondary band; and
perform, when the apparatus is operating on the secondary frequency band, a reselection on the secondary frequency band by at least evaluating one or more available neighbor cells included in the neighbor cell list for the primary frequency band.

7. The apparatus according to claim 6, wherein the apparatus is further caused to at least:
reselect, based on the evaluation of the one or more neighbor cells, to a neighbor cell included in the neighbor cell list of the primary frequency band.

8. The apparatus according to claim 7, wherein the apparatus is further caused to at least:
determine, based on an absolute radio frequency channel number for the primary frequency band, an absolute radio frequency channel number for a frequency band supported by the apparatus.

9. The apparatus according to claim 6, wherein the apparatus is further caused to at least:
receive a neighbor cell list for the secondary frequency band, wherein the neighbor cell list for the secondary frequency band identifies one or more neighbor cells that are intra-frequency neighbors, and wherein the neighbor cell list for the secondary frequency band is same as the neighbor cell list for the primary frequency band.

10. The apparatus according to claim 6, wherein the apparatus is further caused to at least:
determine that the primary frequency band is not supported; and
reselect to a neighbor cell on a supported frequency band.

11. A non-transitory computer readable medium having program code which, when executed by an apparatus, causes operations comprising:
    receiving, at a user equipment, a neighbor cell list for a primary frequency band rather than a secondary frequency band, the primary frequency band having one or more reselection parameters in common with the secondary frequency band, wherein the primary frequency band is a band that is indicated by a serving cell as the band of a serving carrier frequency, and the secondary band is a band that is indicated by the serving cell as an additional band that allows the user equipment to also camp on the cell using a radio frequency that is supported by the secondary band; and
    performing, by the user equipment operating on the secondary frequency band, a reselection on the secondary frequency band by at least evaluating one or more available neighbor cells included in the neighbor cell list for the primary frequency band.

12. The non-transitory computer readable medium according to claim 11, further comprising:
    reselecting, based on the evaluation of the one or more neighbor cells, to a neighbor cell included in the neighbor cell list of the primary frequency band.

13. The non-transitory computer readable medium according to claim 12, further comprising:
    determining, based on an absolute radio frequency channel number for the primary frequency band, an absolute radio frequency channel number for a frequency band supported by the user equipment.

14. The non-transitory computer readable medium according to claim 11, further comprising:
    receiving, at the user equipment, a neighbor cell list for the secondary frequency band, wherein the neighbor cell list identifies one or more neighbor cells that are intra-frequency neighbors, and wherein the neighbor cell list for the secondary frequency band is same as the neighbor cell list for the primary frequency band.

15. The computer program product according to claim 11, further comprising:
    determining, by the user equipment, that the primary frequency band is not supported; and
    reselecting, by the user equipment, to a neighbor cell on a supported frequency band.

\* \* \* \* \*